United States Patent [19]

Borzcik et al.

[11] 4,200,936

[45] Apr. 29, 1980

[54] ASYNCHRONOUS BIDIRECTIONAL DIRECT SERIAL INTERFACE LINKING A PROGRAMMABLE MACHINE FUNCTION CONTROLLER AND A NUMERICAL CONTROL

[75] Inventors: Paul S. Borzcik, Cincinnati, Ohio; Frank W. Hesford, Letchworth, England

[73] Assignee: Cincinnati Milacron Inc., Cincinnati, Ohio

[21] Appl. No.: 715,132

[22] Filed: Aug. 17, 1976

[51] Int. Cl.² .................... G06F 3/04; G05B 19/18
[52] U.S. Cl. .................................. 364/900; 364/107
[58] Field of Search ... 364/200 MS File, 900 MS File, 364/104, 107

[56] References Cited

U.S. PATENT DOCUMENTS

| | | | |
|---|---|---|---|
| 3,566,365 | 2/1971 | Rawson et al. | 364/900 |
| 3,573,737 | 4/1971 | Rosenberg | 364/200 |
| 3,573,738 | 4/1971 | Bottles et al. | 364/200 |
| 3,668,653 | 6/1972 | Fair et al. | 364/900 |
| 3,753,238 | 8/1973 | Tutelman | 364/200 |
| 3,810,104 | 5/1974 | Markley | 364/200 |
| 3,848,233 | 11/1974 | Lotan et al. | 364/900 |
| 3,898,620 | 8/1975 | Leterrier | 364/900 |
| 3,909,791 | 9/1975 | Van Den Berg | 364/900 |
| 3,942,158 | 3/1976 | Dummermuth | 364/900 |
| 3,979,728 | 9/1976 | Reddaway | 364/200 |
| 4,071,911 | 1/1978 | Mazur | 364/900 |
| 4,130,883 | 12/1978 | Hazelton | 364/900 |

OTHER PUBLICATIONS

"MC6850 Asynchronous Communications Interface Adapter" in *M6800 Microprocessor Application Manual*, pp. 3-21-3-28, Motorola Inc., 1975.

*Primary Examiner*—Melvin B. Chapnick
*Attorney, Agent, or Firm*—C. Richard Eby

[57] ABSTRACT

An interface for serially transmitting single bit contact information between a programmable machine function controller and another numerical control. The contact interface is divided into a machine controller interface and a numerical control interface. The machine controller interface is comprised of a first receiver/transmitter, a first receiver multiplexer and a first transmitter multiplexer. The first receiver multiplexer controls the transfer of input signals generated by the numerical control from the first receiver/transmitter to the machine function controller. The first transmitter multiplexer controls the transfer of output signals generated from the machine function controller to the first receiver/transmitter. The numerical control interface is functionally similar to the machine controller interface and contains a second receiver/transmitter, second receiver multiplexer and second transmitter multiplexer. The second receiver multiplexer controls the transfer of the output signals from the second receiver/transmitter to the numerical control, and the second transmitter multiplexer controls transfer of the input signals generated from the numerical control to the second receiver/transmitter. The numerical control, the numerical control interface, the machine controller interface and the machine function controller all operate asynchronously with each other. The contact interface permits single data bit contact information to be serially transferred between the numerical control and the programmable machine function controller along two simple two conductor cables.

5 Claims, 5 Drawing Figures

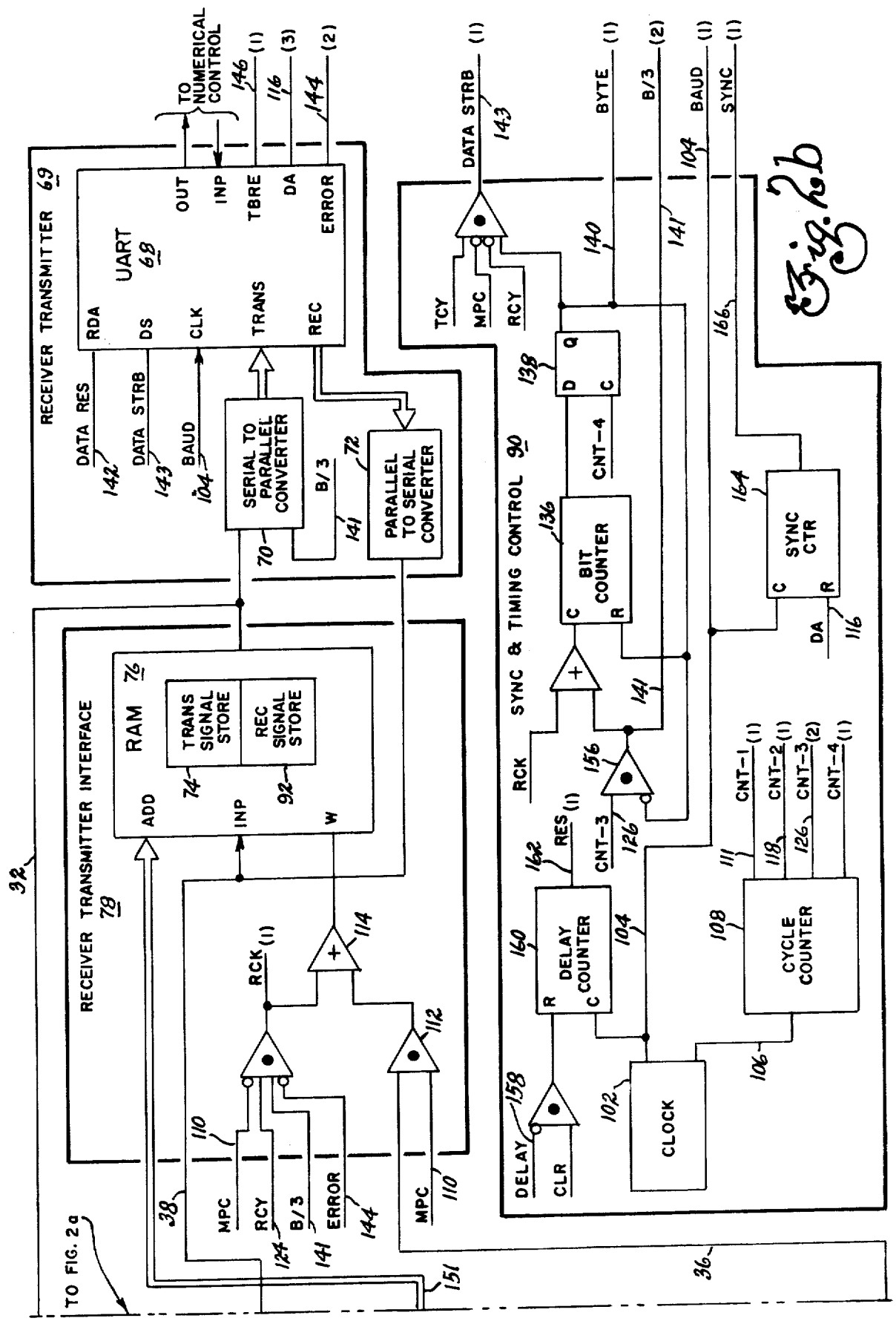

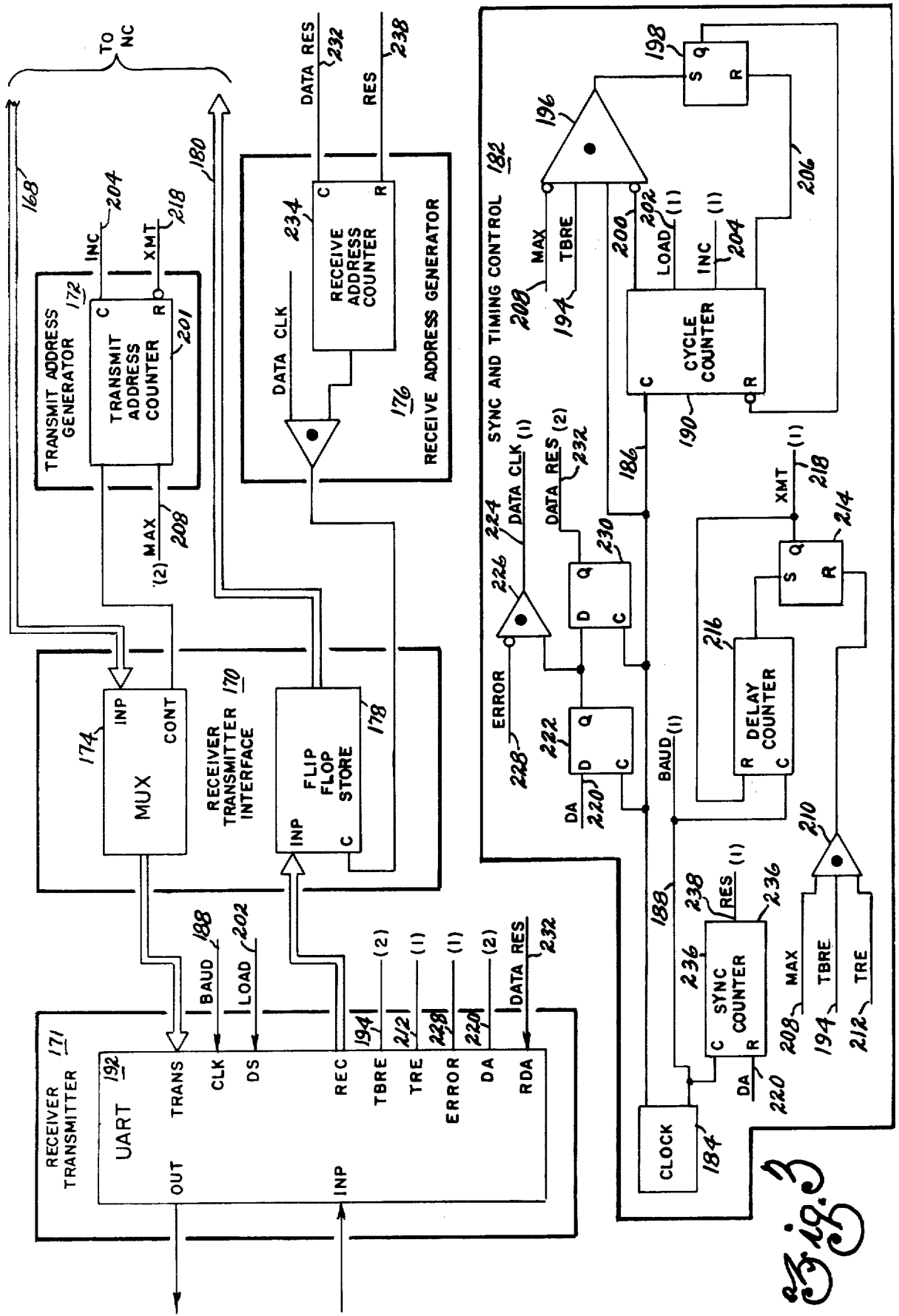

ASYNCHRONOUS BIDIRECTIONAL DIRECT SERIAL INTERFACE LINKING A PROGRAMMABLE MACHINE FUNCTION CONTROLLER AND A NUMERICAL CONTROL

BACKGROUND OF THE INVENTION

The invention relates generally to the area of machine controllers; and specifically, the invention provides apparatus for interfacing machine contact information between a programmable machine function controller and another numerical control.

Ever since the advent of numerical controls, the interface of the numerical control to a machine has been the source of high labor and material costs and reliability problems in the numerical control. In addition to providing slide control information, i.e. electrical signals to control the displacement and velocity of the machine slides, the numerical control must communicate with the machine to control many of its other functions, e.g. tool selection, spindle direction and speed, coolant selection axis permission and overtravel, etc. These signals may vary from DC control levels to standard AC voltage levels. Therefore, a typical numerical control may require hundreds of interconnecting wires between it and the machine. This wiring is expensive from a material and labor standpoint the first time the machine is assembled in the manufacturer's facility. Each time the machine is moved for shipping or other purposes, the costs are intensified because the wiring must be disconnected and later reconnected. Second, the presence of the various machine control signals, many having inductive loads, in the same control cabinet as the digital logic circuits, inevitably will lead to noise and reliability problems in the numerical To avoid these problems, numerical control manufacturers may use one or more levels of interfacing circuits. A typical example of this may include for each machine control signal the serial combination of an optical isolator, an output drive transistor, a miniture relay, a level shifting amplifier and a high voltage digital switching stage. The inclusion of such circuits for each of the machine control signals is obviously very expensive.

The use of direct wiring of machine to numerical controls did not change until the introduction of programmable machine function controllers which have been commerically available for at least the last five years. The controllers are used to replace the machine magnetic relay circuits and execute the logical operations previously executed by said relay circuits. Consequently, the numerical control is wired directly to the controller and the machine. The use of programmable controllers alleviates some of the problems.

A solution to the extensive wiring required is disclosed by the apparatus discussed in U.S. Pat. No. 3,810,104. According to this patent, the ideal programmable controller should be capable of handling all types of machines. This requires a storage area within the controller sufficient to store all existing machine control signals. However, any one machine may only require one-third to one-half of the total number of signals. Therefore, the patent discloses an apparatus having a memory with a limited storage capacity and an interface circuit for receiving the machine control signals and decoding these signals into addresses usable by the limited storage. Further, the wiring problem is simplified by multiplexing the signals between the numerical control and the controller. The system disclosed in the patent requires control circuits for synchronizing the operation of the interface circuit with the programmable controller. In the prior art system, the programmable controller generates an address signal to the interface circuit and waits for a word corresponding to that address to be returned. This synchronous operation increases the complexity of the timing control circuits required by the programmable controller. Further, the system only provides for the communication of the machine control signals from a numerical control to the programmable controller.

In contrast, the single bit contact interface circuit disclosed herein operates asynchronously with the machine controller and the numerical control, thereby reducing the complexity of the timing control circuits within the programmable controller and the numerical control and improving the reliability of the overall system. Further, the interface circuit disclosed herein is bidirectional; and it is direct in that an intermediate interface decoding stage is not required. All of the contact information is cyclically and continuously transferred between both ends of the interface circuit for use by the numerical control and the machine controller. Further, the transfer of the information does not effect the normal operation of the numerical control or the machine controller. The interface circuit is, in effect, transparent, and the numerical control and machine controller operate completely independently but each using contact information generated by the other. Not only does the interface circuit reduce the amount of wiring required to pass machine control signals between the machine controller and the numerical control, but it provides a hardware standardization for transferring contact information between the machine controller and many types of numerical controls.

SUMMARY OF THE INVENTION

According to one embodiment of the invention, an apparatus is claimed for transmitting single data bit contact information between a numerical control and a programmable machine function controller operating asynchronously with the numerical control. The numerical control has an I/O interface circuit for controlling the transfer of input signals generated by the numerical control and output signals generated by the controller. The controller has a contact bus for conducting the input and output signals. The apparatus is comprised of first and second receiver/transmitters for serially transmitting the input and output signals therebetween. Means are connected between the first receiver/transmitter and the contact bus for controlling the transfer of output signals from the contact bus to the first receiver/transmitter. Further means are connected between the first receiver/transmitter and the contact bus for controlling the transfer of input signals from the first receiver/transmitter to the contact bus. Means are also provided between the second receiver/transmitter and the I/O interface circuit of the numerical control for controlling the transfer of output signals from the second receiver transmitter to the numerical control. Finally, means are connected between the I/O interface circuit and the second receiver/transmitter for controlling the transfer of input signals from the numerical control to the second receiver transmitter.

BRIEF DESCRIPTION OF THE DRAWINGS

FIGS. 2a and 2b when joined along the indicated junction line illustrate a detailed block diagram of the contact interface.

FIG. 3 is a detailed block diagram illustrating one example of a numerical control interface which may be used in association with a hard wired numerical control.

FIG. 4 is a detailed block diagram illustrating a second example of a numerical control interface which may be used in association with a computer numerical control.

DESCRIPTION OF THE PREFERRED EMBODIMENT

Figure 1:
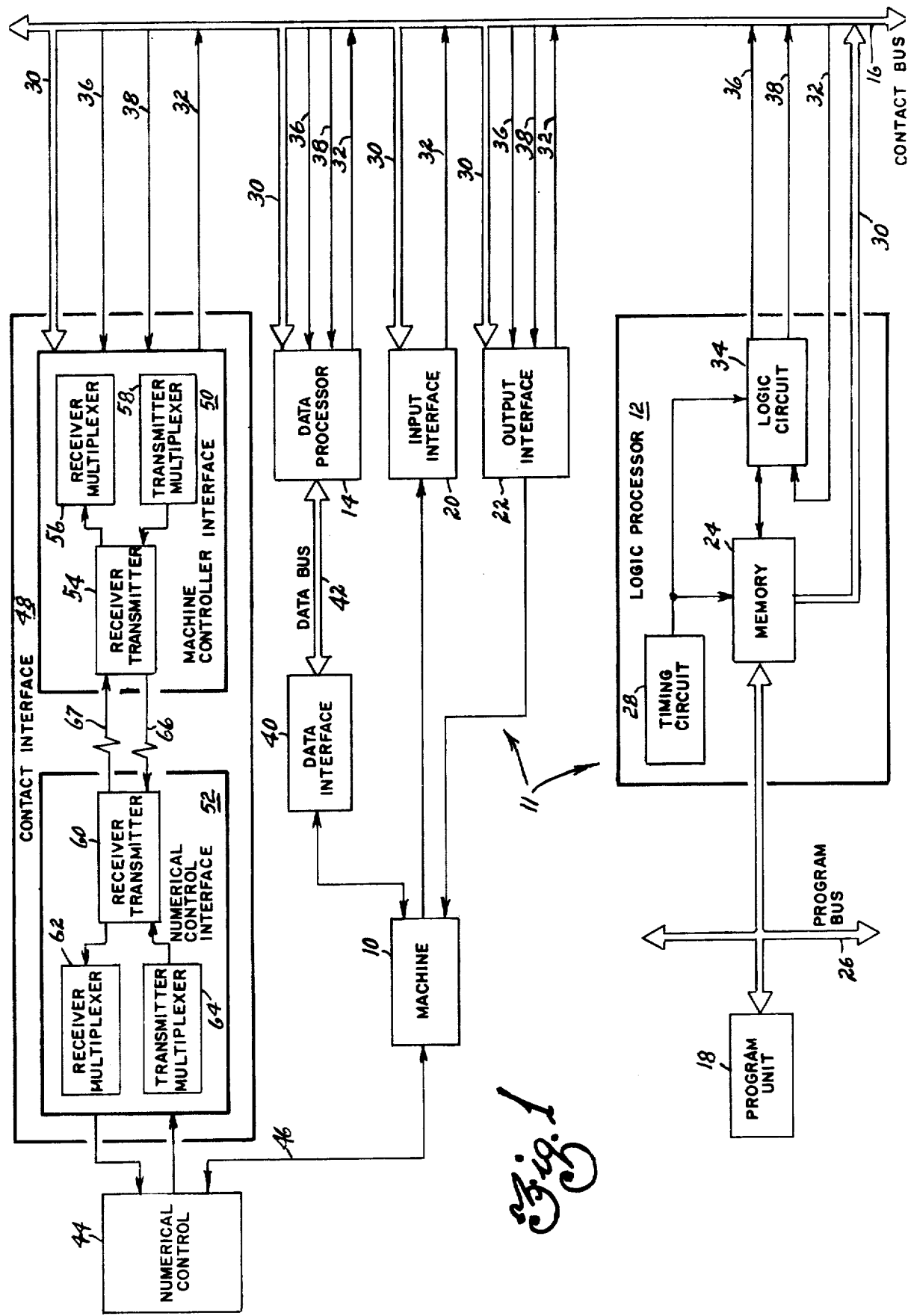
FIG. 1 is a general block diagram illustrating a programmable machine function controller and a contact interface for interconnecting the machine function controller with another numerical control.

FIG. 1 is a general block diagram of a programmable machine function controller and a contact interface for connecting the machine controller with another numerical control. The functional operation of a machine 10 is controlled by the machine controller 11 which is comprised of a logic processor 12, an optional data processor 14, interface circuits 20 and 22 and an interconnecting contact bus 16. The functional operation of the machine may be schematically represented by a ladder or relay diagram. Using this diagram in conjunction with a program unit 18, the program may be created. Each step in the program typically includes a device address and logic function associated therewith. The combination of these two pieces of information is defined as a memory word. The basic machine controller is comprised of the logic processor 12, input interface 20, and output interface 22. In the preferred embodiment, blocks of device addresses are allocated and preassigned according to the devices present, e.g. external coils, external contact inputs, timers, etc. Therefore, using the program unit 18, a programmer selects a starting memory location and works through the ladder diagram serially along each line. Therefore, each memory word will contain an element definition, e.g., no operation, output, input, a device address associated with that element, if applicable, and other necessary functional information relative to the condition of the addressed device, e.g. normally open or normally closed contact state. After the program has been completed, the program unit 18 may be used to transfer the program to the memory 24 of the logic processor 12 via the program bus 26. A timing circuit 28 is operative to continuously scan the memory 24.

As each memory word is read, the device address is transmitted to the contact bus 16 via a contact address bus 30. If the device address represents an input element, the input interface 20 will respond to the device address on the address bus 30 to energize a circuit therein which is connected to receive the state of a corresponding input device located on the machine 10. The state of this addressed input device is transmitted along a contact status line 32 via the contact bus 16 to a logic circuit 34 within the logic processor 12. The logic circuit 34 determines whether or not the actual contact status agrees with the programmed contact status. As long as there is agreement between the programmed and actual conditions, the logic circuit remains in a set state. If the programmed and actual conditions disagree, the logic circuit is reset.

Upon scanning a memory word having a device address corresponding to an output coil, the output interface circuit 22 will decode the device address. Further, each time the logic processor decodes an output element in a memory word, an output strobe signal is generated on an output strobe line 36 which is also transmitted to the output interface board. If the logic circuit has detected a continous correspondence between the actual and programmed conditions of the input devices when a memory word containing an output element is decoded, the logic circuit 34 will produce an output signal in its set state on the output state line 38. The output interface 22 stores the state of the output signal in response to the output strobe signal on line 36. If in its set state, the output signal will energize an element on the machine 10 corresponding to the device address decoded by the output interface 22. This device remains energized until the logic circuit 34 determines that the conditions of the input devices associated with that output element do not correspond with the programmed conditions and therefore will produce on line 38 the output signal in its reset state. Therefore, the operation of certain elements on the machine 10 are controlled as a function of the operational state of other elements on said machine. It should be noted that the logic processor 12 is only capable of making simple logic decisions.

If the output device on the machine must be controlled in accordance with an arithmetic function, a data processor 14 may optionally be connected to the contact bus 16. The data processor operates asynchronously with the logic processor and executes programs of arithmetic instructions which are selected by the logic processor. If the program requires data from the machine for its execution, this data may be obtained from the machine 10 by means of a data interface 40 and data bus 42. A programmable machine function controller as generally described above is described in detail in a copending U.S. patent application Ser. No. 677,712, now U.S. Pat. No. 4,058,711, entitled Asynchronous Dual Function Multiprocessor Machine Control which is assigned to the present assignee. Further, the same machine controller is commercially available from Cincinnati Milacron Inc.

In many situations, the machine 10 will also be controlled by a numerical control 44. The numerical control may take the form of another programmable machine function controller, a computer based control or a hard-wired numerical control, etc. As discussed earlier, the numerical control may produce signals which directly control elements on the machine. An example of this type of signal are machine axis position and velocity signals. Further, certain signals generated on the machine may be wired directly back to the numerical control. An example of such a signal is an emergency shut-off signal. The signals wired directly between the numerical control 44 and machine 10 are represented by the line 46. However, there are a great number of other signals which are required to pass between the numerical control 44 and the machine 10. Generally, these signals relate to the control of some machine function and therefore are routed to the machine function controller 11. Typically, the machine function controller is located in the general proximity of the machine whereas the numerical control 44 may be either in the proximity of the machine or remotely located. In either case, on more complicated machines, the number of machine control signals may number in the hundreds.

In order to substantially reduce the wiring between the numerical control and the machine, reduce the noise problems within the numerical control, simplify the interface circuits in the numerical control and generally improve the reliability of communication between the numerical control and the machine relative to the machine control signals, a contact interface 48 is provided. The contact interface is comprised of two essentially similar elements—a machine controller interface 50 and a numerical control interface 52. The machine controller interface is comprised of a receiver/transmitter 54, a receiver multiplexer 56, and a transmitter multiplexer 58. Similarly, the numerical control interface 52 is comprised of a second receiver/transmitter 60, a second receiver multiplexer 62 and a second transmitter multiplexer 64. To implement the contact interface 48, a block of device addresses is allocated for the transfer of machine control signals. Therefore in response to one of these device addresses representing an output signal on the address bus 30, the first transmitter multiplexer 58 will cause the state of the output signal on line 38 to be transferred to the first receiver/transmitter 54. The output signal is then serially transferred over line 66 to the second receiver/transmitter 60, the second receiver multiplexer 62 and the numerical control 44. The second receiver multiplexer 62 controls the transfer of the state of the output signal from the second receiver/transmitter 60 to the numerical control 44.

In a similar manner, the second transmitter multiplexer 64 controls the transfer of the state of an input signal from the numerical control to the second receiver/transmitter 60. This signal is serially transmitted over the line 67 to the first receiver/transmitter 54, and in response to the appropriate input address on the address bus 30, the receiver multiplexer 56 transfers the state of the input signal along the line 32 back to the logic processor 12 via the contact bus 16. Therefore, instead of the hundreds of wires which were previously run between the numerical control and the machine controller, the lines 66 and 67 may be implemented by two conductor cables. Further, the cables may be anywhere from several feet to several hundred feed in length. It should be noted that the system is bidirectional, and the system is direct in that it does not require special decoding circuits. Further, the receiver/transmitters operate asynchronously with each other as well as asynchronously with the numerical control and the machine controller.

Figure 2A:
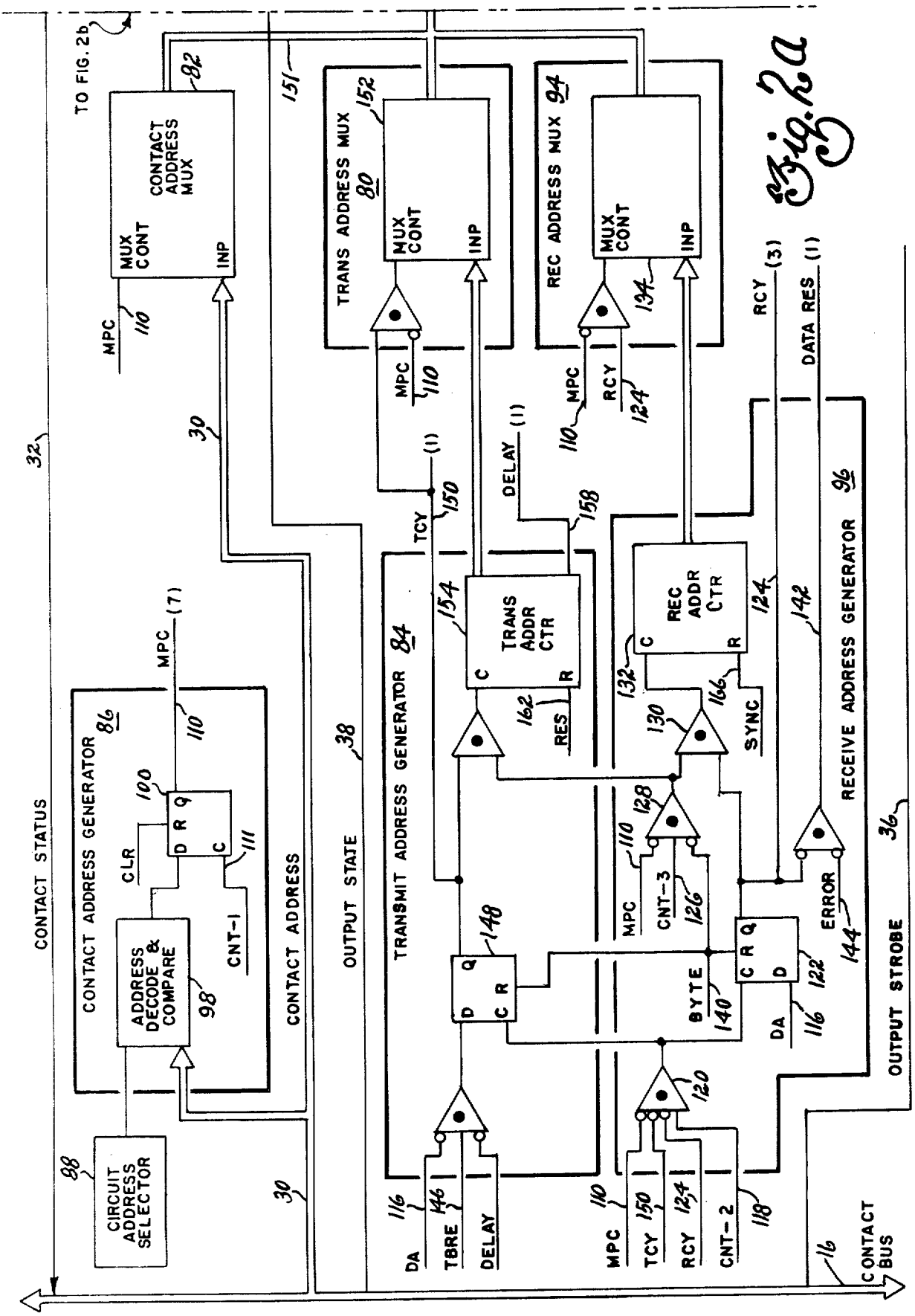
Figure 5:
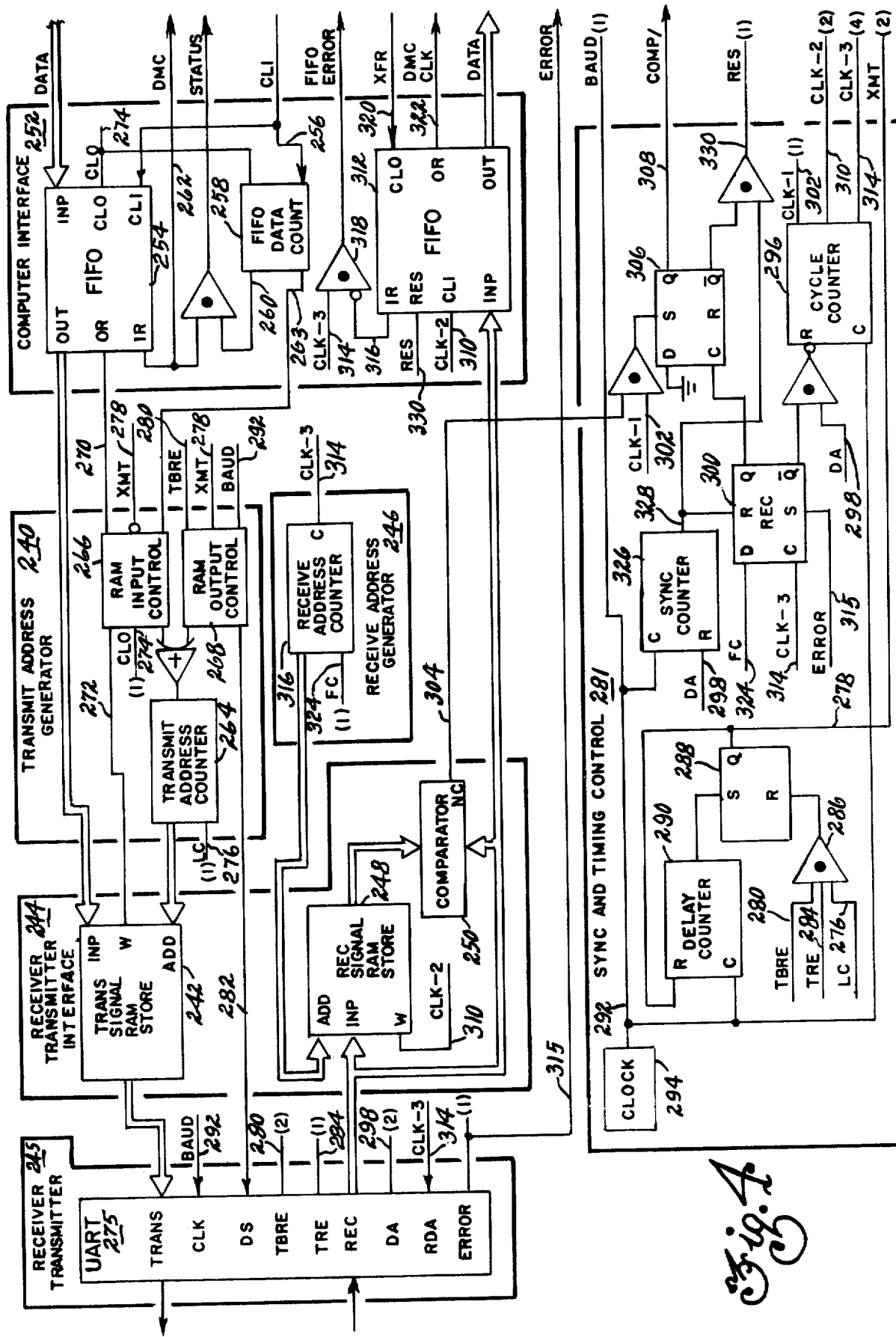

FIGS. 2a and 2b when joined along the indicated junction line illustrate the elements required to implement the machine controller interface 50. In FIG. 2b, the receiver/transmitter 69 is comprised of a universal asynchronous receiver/transmitter (UART) 68 which is a commercially available device, a serial to parallel converter 70 and a parallel to serial converter 72. The first receiver/multiplexer 56 is comprised of the transmit signal store 74 within the RAM 76, the transmit address multiplexer 80, (see FIG. 2a) the contact address multiplexer 82, the transmit address generator 84, the contact address generator 86, the board address selector 88 and portions of the synchronization and timing control 90. The first transmitter multiplexer 58 is comprised of the receiver signal store 92 within the RAM 76, a receive address multiplexer 94, and a receive address generator 96.

Within the receiver/transmitter interface 78, the RAM 76 is shared such that the transmit signal store 74 contains output machine control signals from the contact bus 16 which are generated by the logic processor 12, and the receive signal store 92 contains input machine control signals which are generated by the numerical control. There are three modes of operation which time share the RAM 76. The highest priority mode is responsive to addresses on the contact bus for loading the states of the output signals on the line 38 into the appropriate RAM locations in the transmit signal store 74. In addition, these addresses will cause the states of the signals stored in the RAM to be transmitted back to the contact bus via the line 32. The next highest priority mode causes the states of the input signals generated by the numerical control to be transferred from the UART 68 to the receive signal store 92 of the RAM 76. The lowest priority mode causes the states of the output signals to be transferred from the transmit signal store 74 to the UART 68. It should be remembered that the contact bus is a single data bit bus; and therefore, the output signals from the machine controller and the input signals from the numerical control represent only on or off states of the elements associated with those signals. Consequently, each bit location in the RAM 76 represents the state of one of the machine control signals.

The highest priority cycle of operation will be described first. It was mentioned earlier that a particular block of device addresses were allocated and preassigned to the machine control signals. The purpose of the circuit address selector 88 (see FIG. 2a) is to provide a circuit address which corresponds to the particular block of addresses allocated. Within the contact address generator 86, an address decode and compare circuit 98 compares the device address on the address bus 30 with the selected address from the circuit selector 88. If the device address is one of the addresses within the block of allocated addresses, an output signal is produced to an input of a flip flop 100. Within the sync and timing control 90, in FIG. 2b, a clock 102 produces a baud clock signal on line 104 and a master clock signal on line 106. A cycle counter 108 operates in a continuous manner to produce four cycle counts. Returning to FIG. 2a, on count 1, the flip flop 100 produces an MPC signal on line 110. The MPC signal is provided on the multiplex control input of the contact address multiplexer 82. This causes the contact address multiplexer to select the device address currently on the address bus 30. Next, the contact bus 16 conducts the state of an output signal on line 38 to the input of the RAM 76. Subsequently, the contact bus 16 conducts an output strobe signal on line 36 via gate 112 and 114 to the write input of the RAM 76. This causes the state of the output signal on line 38 to be loaded in the memory location of the transmit signal store 76 corresponding to the device address selected by the contact address multiplexer 82. In addition, this mode of operation can cause the state of any RAM location to be transferred back to the contact bus. Anytime the transmit signal store 74 is addressed by the contact address multiplexer 82, the state of the addressed storage location is fed back to the contact bus via line 32. In other situations, the receive signal store 92 may be addressed by the contact address multiplexer 82 via the address bus 151; and the state thereof is fed back to the contact bus via line 32. However, in these situations, no signals are received on lines 36 or 38.

The next highest priority mode of operation is the receive cycle. After the UART 68 receives one byte of information, a data available signal is generated on line 116. When the cycle counter 108 produces a count 2 signal on line 118, an AND gate 120 generates a clock signal to flip flop 122 which produces a RCY signal on line 124. The RCY signal is transmitted to the multiplex control input of the multiplexer 134 which selects the address currently being produced by the receive address counter 132. In response to the next master clock pulse, the cycle counter 108 generates a count 3 signal on line 126. The count 3 signal causes the write input of the RAM 76 to load the first bit of the available byte of information from the UART via the parallel to serial converter 72 into the storage location corresponding to the address selected by the multiplexer 134. Count three increments the receive address counter 132, via gating networks 128 and 130, thereby causing a new address to be selected by the multiplexer 134. The cycle counter continues its operation sequentially producing the four counts until each bit of the available byte is loaded into the receive signal store 92. After the counter has cycled a number of times corresponding to the number of bits in the byte, the bit counter 136 within the sync and timing control 90 produces an output to the flip flop 138. On the next count 4, the flip flop 138 produces a byte signal on line 140, which is operative to reset the flip flop 122 thereby terminating the RCY signal on line 124. The byte signal on line 140 also resets the bit counter 136. In addition, resetting the flip flop 122 will produce in the absence of an error signal on line 144 from the UART a data reset signal on line 142 to the reset data available input of the UART. It should be noted that as the cycle counter is iterating through its cycles to load the receive signal store, if at any time a count 1 on line 111 generates an MPC signal on line 110, the operation of the receive address counter is inhibited until the MPC signal disappears at which time the operation of the receive address counter is resumed. With each successive data available signal on line 116, the receive address counter continues its operation until all the bytes of a full block of information have been transferred from the UART 68 to the receive signal store 92.

The lowest priority mode of operation controls the transfer of signals from the transmit signal store 74 to the UART 68. When there is no MPC or RCY signal, the transmit buffer register empty (TBRE) signal on line 146 provides an input to flip flop 148. On count 2 from the cycle counter, the flip flop 148 produces a TCY signal on line 150. This signal is transferred to the multiplex control input of a multiplexer 152 which selects the current address being output from the transmit address counter 154. On the next count 3 on line 141, the serial to parallel converter 70 is operative to transfer the contents of the addressed memory location to the appropriate input in the UART 68. On count 4, the transmit address counter is incremented and this new address is available to the multiplexer 152. The loading of the UART in this manner continues with each subsequent sequence of the cycle counter until the bit counter 136 produces an output to the input of flip flop 138. On the subsequent count 4, flip flop 138 produces a byte signal resetting the bit counter and flip flop 148 and inhibiting further count 3 signals from the transmit address counter 154 and the serial to parallel converter 70 via the gate 156. The byte signal on line 140 also produces a data strobe signal to the UART on line 143. This changes the state of the TBRE signal on line 146, thereby inhibiting the UART from accepting further information. When the UART can accept another byte, it again produces a TBRE signal and the transmit address counter continues through its count to transfer another byte of information to the UART.

In response to the last count of the transmit address counter 154, or in other words, after all the bytes of a block of information have been transferred from the transmit signal store into the UART, a delay signal is produced on line 158. This delay signal removes a reset from the delay counter 160 which is then able to respond to a number of baud clock pulses on line 104. After a first predetermined number of baud clock pulses, the delay counter produces a reset signal on line 162 to the reset input of the transmit address counter 154, thereby making it ready for a subsequent transmission cycle. In a similar manner, a sync counter 164 has a clock input responsive to the baud clock pulses on line 104 and a reset input responsive to the data available signal on line 116. After the other receiver/transmitter has transmitted a block of information to the first receiver/transmitter 69, the other receiver/transmitter will go into an identical delay mode as just described relative to the delay counter 160. This causes a time delay before the next data available signal is received which is equal to the first predetermined number of baud clock pulses; and therefore, the sync counter 164 is free to count. After a second predetermined number of baud clock pulses, approximately equal to one-half of the first predetermined number of baud clock pulses, a sync pulse is produced on line 166 which is connected to the reset input of the receive address counter 132, thereby resetting the counter to its original state. To summarize, each of the receiver/transmitters operates identically. After each cycle of a transmit address counter associated with one of the receiver/transmitter's counter, there is a blank transmission time equal to the first predetermined period of time; after which the transmit address counter is reset. A sync counter associated with the other of the receiver/transmitters continuously tries to detect the blank transmission. When it detects a blank transmission time equal to the second predetermined period of time, the receive address counter associated with the other receiver/transmitter is reset. Therefore, even though the receiver/transmitters run on a asynchronous basis, the receive address generator associated with one of the receiver/transmitters is reset synchronized with the transmit address generator associated with the other receiver/transmitter.

As mentioned earlier, the illustration in FIGS. 2a and 2b represents a machine controller interface 50 of FIG. 1. If the numerical control 44 is another programmable machine function controller, then the numerical control interface 52 would merely be a mirror image of the elements shown in FIGS. 2a and 2b. In other words, the receiver/transmitters would be operative to transmit the states of the machine control signals between contact buses.

FIG. 3 is a detailed block diagram illustrating the elements of a numerical control interface 52 when the numerical control is a hardwired numerical control. Connected to the receiver/transmitter 171 is a receiver multiplexer circuit 62 (as defined in FIG. 1) comprised of a transmit address generator 172 and a multiplexing circuit 174 contained within the receiver transmitter interface 170. Further, a transmitter multiplexer 64 (as defined in FIG. 1) is comprised of a receive address generator 176 and a flip flop storage matrix 178 also part of the receiver transmitter interface 170. The numerical control contains an I/O interface circuit (not shown) comprised of storage elements which store the state of the machine control signals. The states of the input signals generated by the numerical control are transmitted over the line 168 to the multiplexer 174. Further, the states of the output signals are transmitted over line 180 from the flip flop storage elements 178 to the I/O interface circuit of the numerical control.

A sychronization and timing control 182 contains a clock 184 producing master clock pulses on line 186 and baud clock pulses on line 188. The cycle counter 190 continuously sequences in response to the master clock pulses. If the UART 192 within the second receiver/transmitter 171 produces a signal on line 194, if the cycle counter 190 is reset and if the transmit address generator 172 is reset, the gate 196 will produce an output to the set input of flip flop 198, thereby removing the reset from the cycle counter 190. On the next master clock, the cycle counter produces an output on line 200 which inhibits further setting of the flip flop 198. On the next clock pulse, the cycle counter produces a load signal on line 202. The load signal clocks the UART to load therein through the multiplexer 174 the states of one byte of input signal corresponding to the addresses on the control input of the multiple bit multiplexer 174. On the next clock pulse, the cycle counter 190 produces an increment signal on line 204 to increment the transmit address counter 201. On the next clock pulse, the cycle counter produces a reset signal on line 206 to reset the flip flop 198, thereby causing the cycle counter itself to be reset. If the conditions on the inputs of the gate 196 are favorable, the next master clock pulse again sets the flip flop 198. After the transmit address counter 201 has cycled through its full count, thereby multiplexing the states of all the input signals to the UART 192, a MAX signal is produced on line 208 which inhibits any outputs from the gate 196 and provides an input to the gate 210.

After the UART has transmitted all of the bytes in a block of information, it produces a transmit register empty signal on line 212 which causes the gate 210 to reset flip flop 214, thereby removing the reset from the delay counter 216. The state of the transmit signal on line 218 is also operative to hold the transmit address counter 201 in its reset state, thereby prohibiting any further transmissions by the UART. The delay counter 216 responds to the first predetermined number of baud clock pulses after which it produces a signal on the set input of flip flop 214, thereby generating a transmit signal on line 218. This signal resets the delay counter 216 and removes the reset from the transmit address counter 201, thereby allowing it to again engage in a transmission. As described earlier, by inhibiting the transmission of the UART for the first predetermined number of baud pulses, a data available signal will not be generated by the first receiver transmitter 69 (see FIG. 2b); and therefore, the sync and timing control 90 will be operative to generate a sync signal on line 166, thereby resetting the receive address counter 132.

When the UART 192 produces the data available signal on line 220, the flip flop 222 responds to the master clock to generate a data clock signal on line 224 via gate 226 in the absence of an error signal on line 228. The data clock signal is operative to clock the flip flop store 178, thereby storing the byte of information available from the UART. On the next master clock pulses, the flip flop 230 produces a data reset signal on line 232 which is operative to clock the receive address counter 234. In addition, the data reset signal is connected to the reset data available input of the UART. After another two master clock pulses, the data reset signal on line 232 is terminated and the system is ready for another data available. When the next data available signal comes, the data clock signal is operative to transfer the signals from the UART into the flip flop store locations defined by the new address from the receive address counter 234. This process continues until the first receiver/transmitter 69 has completed its full transmit cycle at which point it goes into a delay mode. While in the delay mode, no data available signals will be generated on line 220 and the sync counter 236 will be able to count through the second predetermined number of baud clock pulses. When this occurs, it produces an output on line 238 which is operative to reset the receive address counter 234.

FIG. 4 is a detailed block diagram illustrating the elements of the numerical control interface 52 (of FIG. 1) when the numerical control 44 is embodied by a computer numerical control. In this case, the transmitter multiplexer 64 is comprised of a transmit address generator 240 and a transmit signal ram 242 contained within a receiver transmitter interface 244. Similarly, the receiver multiplexer 62 is comprised of a receive address generator 246, a receive signal ram store 248 and a comparator 250.

The computer interface 252 represents an I/O interface circuit within the computer numerical control to interface the machine control signals between the receiver/transmitter interface 244 and the computer. The states of the input signals generated by the computer numerical control are loaded 8 bits at a time into a first-in first-out (FIFO) store 254 in response to a clock input signal from the computer on line 256. The FIFO data counter 258 has a first output 260 representing the total number of bytes in the FIFO store 254. This signal in combination with the input ready signal on 262 are fed back to the computer and determine when the next clock input signal on line 256 may be generated. The FIFO data counter 258 also produces a signal on line 263 indicating that the FIFO contains at least sixteen bytes of information. The transmit address generator 240 is comprised of a transmit address counter 264, a ram input control 266, and a ram output control 268. The transmit signal ram store 242 is a 16 byte store. Therefore, at least 16 bytes of information must be in the FIFO store 254 in order to fully load the transmit signal ram store 242. When the FIFO produces an output ready signal on line 270, the ram input control 266 generates a clock signal on line 272 to clock the write input of the transmit signal ram store 242. Next, the ram input control 266 generates a clock output signal on line 274 to clock the FIFO store 254. In addition, the ram input control 266 is operative to increment the transmit address counter 264, thereby fully loading the transmit signal ram store 242. After the transit address counter 264 has counted through a complete cycle, it produces a LC signal on line 276. It should be noted that the ram 242 can only be loaded from the FIFO during the delay time after a transmission cycle of the UART. This is provided by the transmit signal on line 278. When not in the delay mode, the UART 275 and the receiver/transmitter 245 will produce a transmitter buffer register empty signal on line 280. In response to this signal, the ram output control 268 produces an output signal on line 282 to the strobe input of the UART 275. This causes the output states of eight input signals to be transferred from the transmit signal ram store 242 to the UART 275. Further, the ram output control 268 is operative to increment the transmit address counter 264. When the TBRE signal again occurs, another byte of signals is transmitted to the UART.

After all the signals in the transmit signal ram store 242 have been transmitted to the UART, and the UART has transmitted these signals to the receiver/transmitter 69, the UART produces a transmitter register empty signal on line 284. This signal causes the gate 286 to reproduce a signal resetting the flip flop 288 and disabling the transmit signal on line 278. This also removes the reset from the delay counter 290 and allows the delay counter to count the first predetermined number of baud clock pulses on line 292 from the clock 294. It is during this time that the ram input control 266 is operative to reload the transmit signal ram store 242 from the FIFO store 254. Also, during the delay time, while the transmit signal is disabled, the sync counter 164 is operative to produce a sync signal on line 166 to reset the receive address counter 132 within the receiver multiplexer 56 of the machine controller interface 50.

A cycle counter 296 within the sync and timing control 281 is responsive to the baud clocks on line 292. When the UART 275 produces a data available on line 298, and the flip flop 300 is reset, the reset is removed from the cycle counter 296; and the cycle counter produces a clock 1 signal on line 302. The comparator 250 compares the output of the receive signal ram store 248 with the current output of the UART 275. If the outputs are the same, the UART has no new information for the computer; therefore, it will not be interrupted. However, if the comparator detects a difference between the current UART output and the previous UART output as represented by the output of the receiver signal ram store 248, the comparator 250 produces a no compare signal on line 304. This signal in combination with the clock 1 signal is operative to set flip flop 306 and produce a no compare signal on line 308 to the computer. On the next clock pulse on line 292, the cycle counter produces a clock 2 signal on line 310. The clock 2 signal is operative to write the current UART output into the receiver signal ram store 248 and also generate a clock input signal to the FIFO 312 within the computer interface 252, thereby storing the current UART output therein. On the next clock pulse, counter 296 produces a clock 3 signal on line 314. The clock 3 signal is operative to provide a reset data available input to the UART 275 and a clock input to the receive address counter 316 within the receive address signal generator 246. If at this time, the FIFO store 312 has not generated an input ready signal on line 316, the gate 318 produces a FIFO error signal back to the computer.

It should be noted at this point that while the FIFO store 312 is being loaded, the computer is asynchronously generating a transfer signal on line 320 in response to an output ready signal on line 322 to output data from the FIFO store 312 to the computer. Further, since the receive address counter has not counted to its maximum count, flip flop 300 will not be operative to produce a reset signal. Therefore, after clock 3 resets the data available signal, this causes the cycle counter 296 to reset. The next occurrence of the data available signal removes the reset from the cycle counter 296, and it produces another sequence of clock pulses which are operative to clock the next byte of information into the receive signal ram store 248 and the FIFO store 312 and increment the receive address counter.

The process continues in this manner until the receive address counter reaches its maximum count of 16, at which time it produces a signal on line 324 which provides an input to the flip flop 300. On the next clock 3 signal, the flip flop 300 produces an output to reset the flip flop 306 and cycle counter 296. At this point, the receiver/transmitter 69 is in a delay state for the first predetermined number of baud clock pulses. Therefore, the sync counter 326 can count the second predetermined number of baud clock pulses, thereby producing an output on line 328 to reset the flip flop 300 and generate a reset signal on line 330 to reset the FIFO store 312. It should be noted that during the receive cycle of operation, if during its full cycle of operation, the comparator does not produce a no compare signal on line 304, the flip flop 306 will never be set; and therefore, the no compare signal will not be generated on line 308. Consequently, the computer knows to ignore the current contents of the FIFO store 312.

While the invention has been illustrated in some detail according to the preferred embodiments shown in the accompanying drawings, and while the preferred illustrated embodiments have been described in some detail, there is no intention to limit the invention to such detail. On the contrary, it is intended to cover all modifications, alterations and equivalents falling within the spirit and scope of the appended claims.

What is claimed is:

1. An apparatus for transmitting single data bit input and output signal states representing the operation of devices on a machine between a numerical control and an asynchronously operating programmable machine function controller located with the machine, said numerical control generating input signal states to control a machine cycle of operation, said controller generating output signal states in response to predetermined combinations of input signal states and address signals to identify the input and output signals, and said controller being connected to a single data bit contact bus for communicating the input and output signal states with the controller, the apparatus comprising:
   (a) a first receiver/transmitter located with and electrically coupled to the controller, said first receiver/transmitter operating asynchronously from the controller and the numerical control for continuously transmitting the output signal states during continuously occurring transmit cycles and receiving the input signal states;
   (b) a second receiver/transmitter located with and electrically coupled between the first receiver/transmitter and the numerical control, said second receiver/transmitter operating asynchronously from the first receiver/transmitter, the numerical control and the controller for transmitting the input signal states during continuously occurring transmit cycles and receiving the output signal states;
   (c) a first multiplexing circuit connected between the first receiver/transmitter and the controller and including
      (1) a first buffer store comprising a first transmit signal store responsive to the output signal states from the contact bus and a first receive signal store responsive to the input signal states from the first receiver/transmitter,
      (2) first means operating independently of the controller for transferring the input signal states from the first receiver/transmitter to the first receive signal store in response to the first receiver/transmitter receiving a number of input signal states, said first transferring means further transferring the output signal states from the first transmit signal store to the first receiver/transmitter in response to the first receiver/transmitter being ready to accept a number of output signal states, and (3) first means responsive to the address signals for controlling the transmission of the input and output signal states between the contact bus and the first buffer store; and (d) a second multiplexing circuit connected between the second receiver/transmitter and the numerical control and including (1) a second buffer store comprising a second transmit signal store responsive to the input signal states from the numerical control and a second receive signal store responsive to the output signal states from the second receiver/transmitter, (2) second means operating independently of the numerical control for transferring the input signal states from the second transmit signal store to the second receiver/transmitter in response to the second receiver/transmitter being ready to accept a number of input signal states, said second transferring means further transferring the output signal states from the second receiver/transmitter to the second receive signal store in response to the second receiver/transmitter receiving a number of the output signal states, and (3) second means connected to the numerical control and the second buffer store for controlling the transfer of input and output signal states therebetween.

2. The apparatus of claim 1 wherein the first means for controlling the transmission of the input and output signal states further comprises:

(a) means responsive to an address signal for producing a controller mode signal;

(b) means responsive to the controller mode signal and the address signal and connected to the first buffer store for addressing a storage location in the first buffer store;

(c) means responsive to the controller mode signal and connected between the contact bus and the first buffer store for loading an output signal state in the addressed storage location of the first transmit signal store; and (d) means for transmitting the state of the addressed storage location in the first buffer store to the contact bus.

3. The apparatus of claim 2, wherein the first means for transferring the input signal states further comprises:

(a) means responsive to the first receiver/transmitter receiving a number of input signal states for producing a receive mode signal;

(b) first counter means responsive to the receive mode signal and the controller mode signal for addressing a predetermined number of storage locations in the first receive signal store, said first counter means being interrupted in response to and for the duration of the controller mode signal; and (c) a parallel to serial converter connected between the first receiver/transmitter and the receive signal store; and (d) first gating means responsive to the receive mode signal for causing the input signal states to be transferred from the first receiver/transmitter to the addressed storage locations in the first receive signal store via the parallel to serial converter.

4. The apparatus of claim 3 wherein the first means for transferring the output signal states further comprises:

(a) means for producing a transmit mode signal in response to the first receiver/transmitter being ready to accept a number of output signal states but not having received a number of input signal states;

(b) second counter means responsive to the transmit mode signal and the controller mode signal for addressing a predetermined number of storage locations in the first transmit signal store, said second counter means being interrupted in response to and for the duration of the controller mode signal;

(c) a serial to parallel converter connected between the first buffer store and the first receiver/transmitter; and (d) means connected to the serial to parallel converter for causing the output signal states in the addressed storage locations in the first transmit signal store to be transferred to the first receiver/transmitter via the serial to parallel converter.

5. The apparatus of claim 4 wherein the first multiplexing circuit further comprises:

(a) means connected to the second counter means for detecting the completion of a cycle of the second counter means;

(b) means connected to the detecting means for inhibiting the execution of a subsequent cycle of the second counter means for a first predetermined period of time; and (c) means connected to the first receiver/transmitter and the first counter means for producing a sync signal in response to the first receiver/transmitter not receiving a number of input signal states for a second predetermined period of time, said sync signal being operative to reset the first counter means.

* * * * *